(12) United States Patent
Partridge

(10) Patent No.: US 12,135,090 B2
(45) Date of Patent: Nov. 5, 2024

(54) CHECK VALVE

(71) Applicant: FMC Technologies, Inc., Houston, TX (US)

(72) Inventor: Jeffrey Michael Partridge, Spring, TX (US)

( * ) Notice: Subject to any disclaimer, the term of this patent is extended or adjusted under 35 U.S.C. 154(b) by 59 days.

(21) Appl. No.: 16/586,752

(22) Filed: Sep. 27, 2019

(65) Prior Publication Data
US 2021/0095772 A1 Apr. 1, 2021

(51) Int. Cl.
*F16K 15/03* (2006.01)
*F16K 27/02* (2006.01)

(52) U.S. Cl.
CPC .......... *F16K 15/03* (2013.01); *F16K 27/0227* (2013.01)

(58) Field of Classification Search
CPC .... F16K 15/03; F16K 27/0227; Y10T 137/79; F16F 1/36; F16F 1/373; F16F 1/3732; F16F 1/376
See application file for complete search history.

(56) References Cited

U.S. PATENT DOCUMENTS

| | | | | |
|---|---|---|---|---|
| 79,527 A * | 6/1868 | Wilson | ..................... | F16K 15/03 137/527.2 |
| 991,784 A * | 5/1911 | Kiley | ..................... | F16K 15/03 137/527.4 |
| 1,982,189 A * | 11/1934 | Anderson | ........... | F16K 27/0232 137/527.2 |
| 2,925,827 A * | 2/1960 | Anderson | ................ | F16K 15/03 137/527.4 |
| 3,038,494 A * | 6/1962 | Gulick | ..................... | F16K 15/03 137/527.2 |
| 3,068,903 A * | 12/1962 | Haenky | .................. | F16K 15/188 137/630.22 |
| 4,120,318 A * | 10/1978 | Jourdan | ................... | F16K 15/03 137/527.4 |
| 4,460,011 A * | 7/1984 | Huber, Jr. | .................. | B24C 7/00 137/375 |
| 4,469,122 A * | 9/1984 | Meek | ...................... | F16K 15/03 137/312 |
| 4,862,910 A * | 9/1989 | Lee | .......................... | F16K 15/03 137/270 |
| 6,889,988 B2 * | 5/2005 | Cai | ..................... | B60G 21/0551 267/293 |
| 7,784,489 B2 * | 8/2010 | Paulin | ................... | F04D 29/628 137/527.2 |

* cited by examiner

*Primary Examiner* — Kenneth Rinehart
*Assistant Examiner* — Nicole Gardner
(74) *Attorney, Agent, or Firm* — Henry C. Query, Jr.

(57) ABSTRACT

A check valve which includes a valve body having an inlet end, an outlet end and a flow bore that extends between the inlet and outlet ends; a valve seat which is positioned across the flow bore; and a flapper which is configured to seal against the valve seat. The flapper is connected to or formed integrally with a pivot pin and is pivotable between a closed position in which the flapper is positioned against the valve seat and an open position in which the flapper is displaced from the valve seat. The pivot pin has opposite first and second ends, each of which is supported in a corresponding resilient bushing which is supported in the valve body. The resilient bushings allow the flapper to better align with the valve seat when the flapper is in the closed position.

30 Claims, 9 Drawing Sheets

CHECK VALVE

The present disclosure relates to a swing check valve which comprises a flapper for controlling fluid flow through the valve. More particularly, the present disclosure relates to a swing check valve in which the flapper is connected to or formed integrally with a pivot pin whose ends are supported in resilient bushings to allow the flapper to better align with the valve seat when the flapper is in the closed position.

BACKGROUND OF THE INVENTION

Prior art swing check valves include a flapper which is configured to engage a valve seat positioned across a flow bore that extends through the valve body. The flapper is pivotally connected by a pivot pin to the valve body or to a separate component which is supported by the valve body. During normal flow conditions, the flapper is maintained in a raised, open position by fluid flow through the flow bore. But when the fluid flow reverses, the flapper pivots to a closed position under the influence of gravity and seals against the valve seat to thereby prevent backflow through the check valve.

In order to effect a proper seal between the flapper and the valve seat when the fluid flow reverses, the mating sealing surfaces of these components must be aligned when the flapper is in the closed position. However, manufacturing tolerance limitations may prevent exact alignment between the sealing surfaces. In some cases, the flapper may hang slightly ajar from the valve seat. In some situations, low pressure differentials across the flapper can often force the mating sealing surfaces into alignment to thereby effect a proper seal. In extreme cases, however, the manufacturing errors may prevent the sealing surfaces from aligning even under large pressure differentials.

A common solution to the misalignment problem between the mating sealing surfaces of the flapper and the valve seat is to provide larger than ideal clearances between the pivot pin and the valve body. This allows the flapper and the pivot pin to drift until the sealing plane of the flapper aligns with the fixed sealing plane of the valve seat. However, this solution does not always result in the alignment of the sealing planes when fluid flow stops, and the sealing planes may not fully align until the fluid flow reverses sufficiently to force the flapper against the valve seat.

Articulating flappers, i.e., flappers in which the flapper is formed separately from the pivot pin, are sometimes used to address the misalignment problem between the mating sealing surfaces of the flapper and the valve seat. In such flappers, the articulating joint between the flapper and the pivot pin will provide the flapper with slight angular freedom so that the sealing plane of the flapper will align with the fixed sealing plane of the valve seat when the flapper is in the closed position. Although this solution works reliably well, it requires a separate flapper and pivot pin. In addition, the articulating joint often results in the centerline of the flapper being offset from the centerline of the valve seat due to the clearances between the flapper and the pivot pin. This situation is not ideal, because it requires a larger than desired overlap between the sealing surfaces of the flapper and the valve seat in order to ensure that the seal will be effective.

SUMMARY OF THE INVENTION

In accordance with the present disclosure, these and other limitations in the prior art are addressed by providing a check valve which comprises a valve body which includes an inlet end, an outlet end and a flow bore that extends between the inlet and outlet ends; a valve seat which is positioned across the flow bore; and a flapper which is configured to seal against the valve seat, the flapper being connected to or formed integrally with a pivot pin and being pivotable between a closed position in which the flapper is positioned against the valve seat and an open position in which the flapper is displaced from the valve seat. The pivot pin comprises opposite first and second ends, each of which is supported in a corresponding resilient bushing which is supported in the valve body.

In accordance with one embodiment of the disclosure, each bushing is positioned in a corresponding pocket which is fixed in position relative to the valve body. In this embodiment, each pocket may be formed directly in the valve body. Also, each pocket may comprise a bottom and opposite first and second sides.

In accordance with another embodiment of the disclosure, each bushing comprises a socket within which the corresponding first or second end of the pivot pin is positioned. Each bushing may also comprise a base which is positioned beneath the socket and supported on the bottom of the pocket. Each bushing may further comprise a number of flexible supports which extend laterally relative to the socket and engage at least one of the first and second sides of the pocket. In accordance with yet another embodiment of the disclosure, the valve body includes a cavity within which the flapper is positioned, a top opening which is connected to the cavity, and a bonnet cap assembly which is removably secured in the top opening. In addition, the bonnet cap assembly may comprise a seal cap which is positioned in the top opening and sealed to the valve body to thereby retain pressure in the cavity, and a retainer cap which is secured in the top opening over the seal cap to thereby maintain the seal cap in position. In this manner, the seal cap and the retainer cap can be installed in and removed from the top opening individually. In this embodiment, the seal cap may optionally comprise an axial extension which extends completely through a corresponding hole in the retainer cap to provide a visual indication that the seal cap is in place in the bonnet cap assembly once the bonnet cap assembly is assembled with the valve body.

In accordance with a further embodiment of the disclosure, each bushing may be positioned in a corresponding pocket which is fixed in position relative to the valve body, in which event each bushing may be retained in the pocket by the bonnet cap assembly. In this embodiment, each pocket may comprise a bottom, opposite first and second sides, and an open top which is located in an annular shoulder that is formed in the valve body between the cavity and the top opening. Also, the seal cap may comprise a bottom surface portion which engages the annular seat to thereby retain the bushings in their corresponding pockets.

In accordance with another embodiment of the invention, the valve body includes a cavity within which the flapper is positioned, the flow bore comprises a downstream portion which extends between the cavity and the outlet end, and the check valve further comprises a urethane insert which is positioned in the downstream portion adjacent the cavity. The insert may be positioned, e.g., in an enlarged diameter recess in the downstream portion. In addition, the insert may comprise an upstream end face which is oriented at an angle relative to a centerline of the flow bore. The check valve may also comprise means for retaining the insert in the downstream portion of the flow bore. The means for retaining the insert in the downstream portion of the flow bore may comprise, e.g., a number of circular retention ridges which are formed in the downstream portion or the recess coaxially therewith and engage an outer diameter surface of the insert. Although not required, the check valve may further comprise a stiffening ring which is bonded to or embedded in an outer diameter surface of the insert coaxially with therewith to thereby help retain the insert in position in the downstream portion of the recess.

In accordance with yet another embodiment of the present disclosure, each bushing may comprise a circular rim which is formed at an opening of the socket and is configured to engage a corresponding annular shoulder which is formed on the pivot pin adjacent a respective first or second end to thereby inhibit abrasive particles in the flow bore from contacting the first and second ends.

In an alternative embodiment of the disclosure, the bonnet cap assembly may comprises a seal cap which is positioned in the top opening and sealed to the valve body to thereby retain pressure in the cavity; a segmented ring which engages the seal cap to thereby maintain the seal cap in position in the top opening; and a locking ring which engages the segmented ring to thereby maintain the segmented ring in position against the seal cap. In this manner, the seal cap, the segmented ring and the locking ring can be installed in and removed from the top opening individually. In this embodiment, the segmented ring may be comprised of a single segment or a plurality of individual segments.

In a further embodiment of the invention, the segmented ring may comprise a downwardly directed portion which is configured to engage an upwardly directed portion of the seal cap, a radially outer portion which is configured to engage a matching locking profile in the valve body, and a radially inner portion. In addition, the locking ring may comprise a radially outer portion which is configured to engage the radially inner portion of the segmented ring such that, when the locking ring is inserted between the seal cap and the segmented ring and moved into a locked position, the radially outer portion of the locking ring engages the radially inner portion of the segmented ring and forces the segmented ring radially outwardly into the locking profile. Furthermore, the bonnet cap assembly may comprise means for moving the locking ring into the locked position. The means for moving the locking ring into the locked position may comprise, e.g., a number of screws which are inserted through corresponding holes in the locking ring and into corresponding threaded holes in the seal cap.

Thus, in one embodiment of the disclosure, misalignment between the mating sealing surfaces of the flapper and the valve seat is addressed by mounting the ends of the pivot pin in resilient bushings which in turn are supported in the valve body. This arrangement will permit the flapper to move into effective sealing engagement with the valve seat even under low pressure differentials. In accordance with one embodiment, the resilient bushings are designed to allow upstream and downstream translation of the pivot pin but still provide a spring force to bias the flapper into its intended position. In this manner, the flapper will seal against the valve seat even with zero or minimal pressure differential across the flapper. This flexibility and biasing spring force will accommodate for manufacturing tolerances that result in misalignment between the mating sealing faces of the flapper and the valve seat.

These and other objects and advantages of the present disclosure will be made apparent from the following detailed description, with reference to the accompanying drawings. In the drawings, the same reference numbers may be used to denote similar components in the various embodiments.

DETAILED DESCRIPTION

Figure 1:
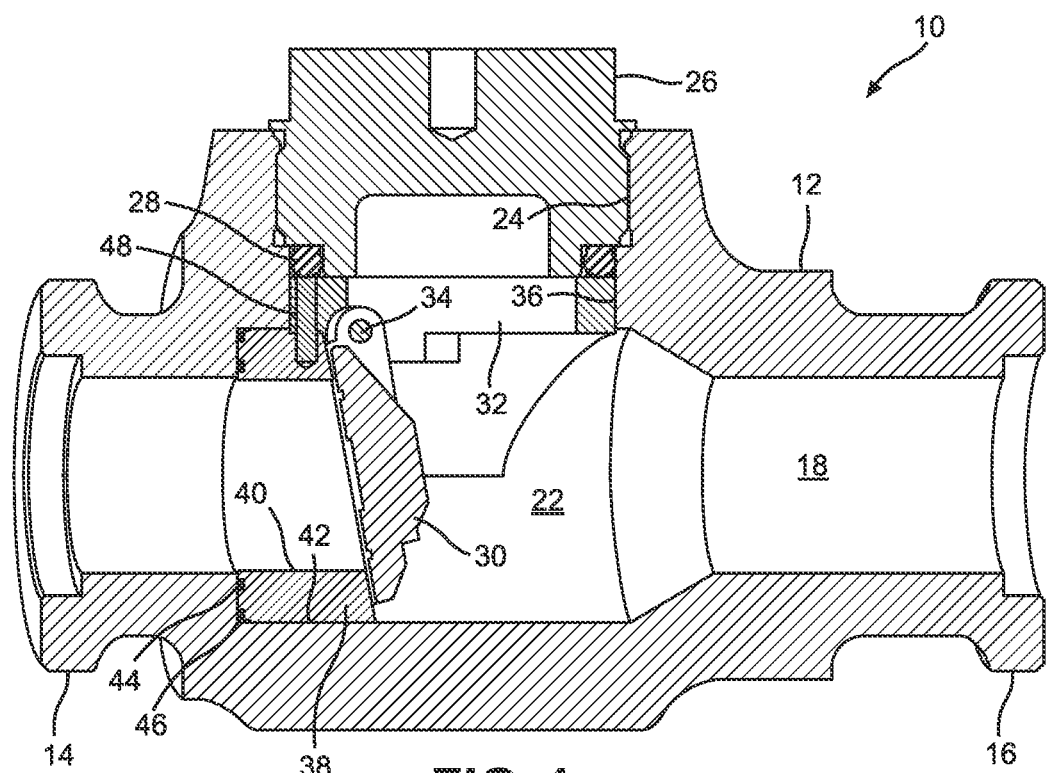
FIG. 1 is a longitudinal cross sectional view of a prior art check valve.
Figure 2:
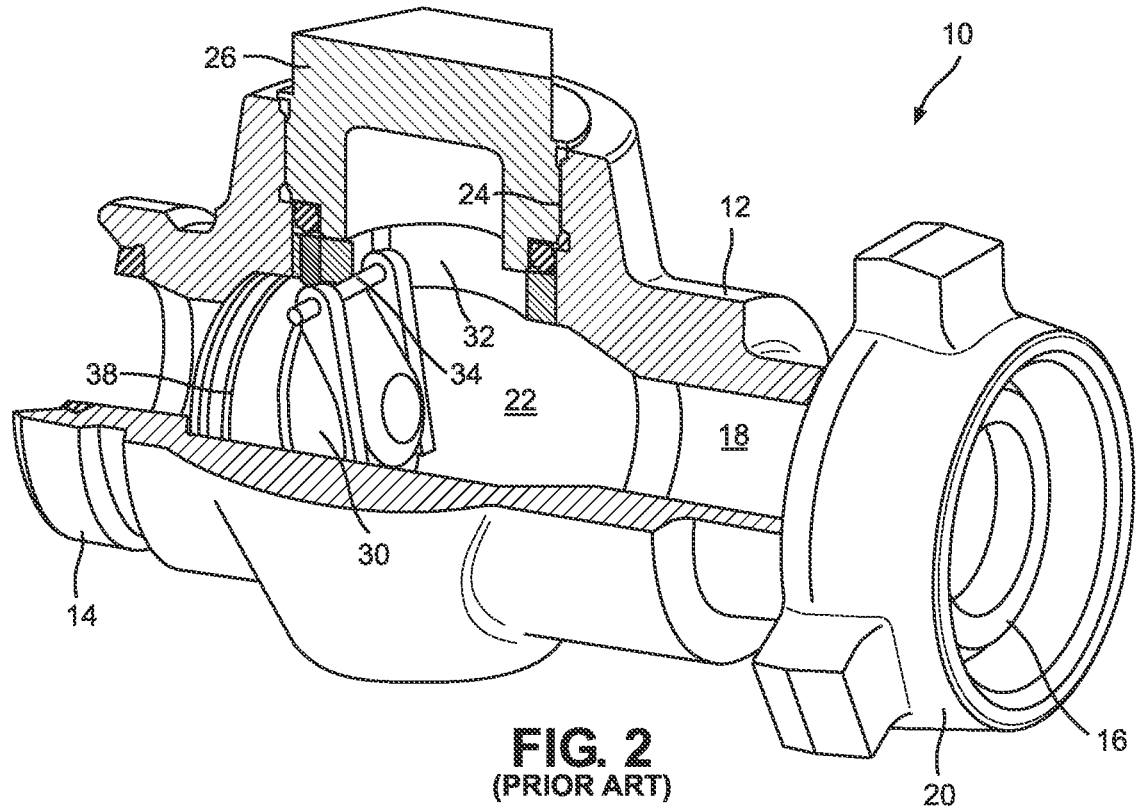
FIG. 2 is perspective view, partly in section, of the check valve shown in FIG. 1.

As context for the present disclosure, an example of a prior art check valve will first be described with reference to FIGS. 1 and 2. This prior art check valve, which is indicated generally by reference number 10, is shown to comprise a valve body 12 having an upstream end 14, a downstream end 16 and a flow bore 18 which extends through the valve body between the upstream and downstream ends. The upstream and downstream ends 14, 16 are configured to be connected to respective flow pipes or other flow components (not shown) by suitable connections, such wing unions 20 (only one of which is shown in FIG. 2). The valve body 12 includes a cavity 22 which is formed coaxially with the flow bore 18. The cavity 22 is accessible through a top opening 24 in the valve body 12 which is closed by a bonnet cap 26 that is threaded into the top opening and sealed to the valve body by a ring seal 28.

The check valve 10 also includes an articulating flapper 30 which in this example is pivotally connected to a retainer ring 32 by a separate pivot pin 34. The retainer ring 32 is positioned in an annular pocket 36 formed in the valve body 12 between the top opening 24 and the cavity 22 and is secured in place by the bonnet cap 26.

The flapper 30 is configured to seal against a valve seat 38 having an axial through bore 40 of approximately the same diameter as the flow bore 18. In this example, the valve seat 38 is a separate, generally cylindrical component which is positioned in a corresponding counterbore 42 and sealed thereto by a pair of ring seals 44, 46. The retainer ring 32 and the valve seat 38 are maintained in their proper orientation in the cavity 22 by an alignment pin 48 which extends through a corresponding hole in the retainer ring and into a matching hole in the valve seat.

In operation of the check valve 10, fluid flows through the flow bore 18 from the upstream end 14 to the downstream end 16 and is prevented from flowing in the opposite direction by the flapper 30. When the fluid flow reverses or the pressure or flow rate in the flow bore 18 upstream of the flapper 30 drops to a predefined level, the flapper pivots downward into a closed position against the valve seat 38 (shown in FIGS. 1 and 2), thereby preventing the fluid from flowing through the flow bore from the downstream end 16 to the upstream end 14.

The prior art check valve 10 has several disadvantages. As discussed above, for example, misalignment between the mating sealing surfaces of the flapper 30 and the valve seat 38 may prevent the flapper from sealing effectively when in the closed position. Also, the bonnet cap 26 may be heavy and difficult to install and remove without external handling equipment, especially in large size check valves. Further, the area of intersection between the cavity 22 and the downstream portion of the flow bore 18 may be subject to undue erosion, especially when the check valve 10 is used with erosive chemicals or particulates at high velocities, such as in well fracturing operations.

Figure 3:
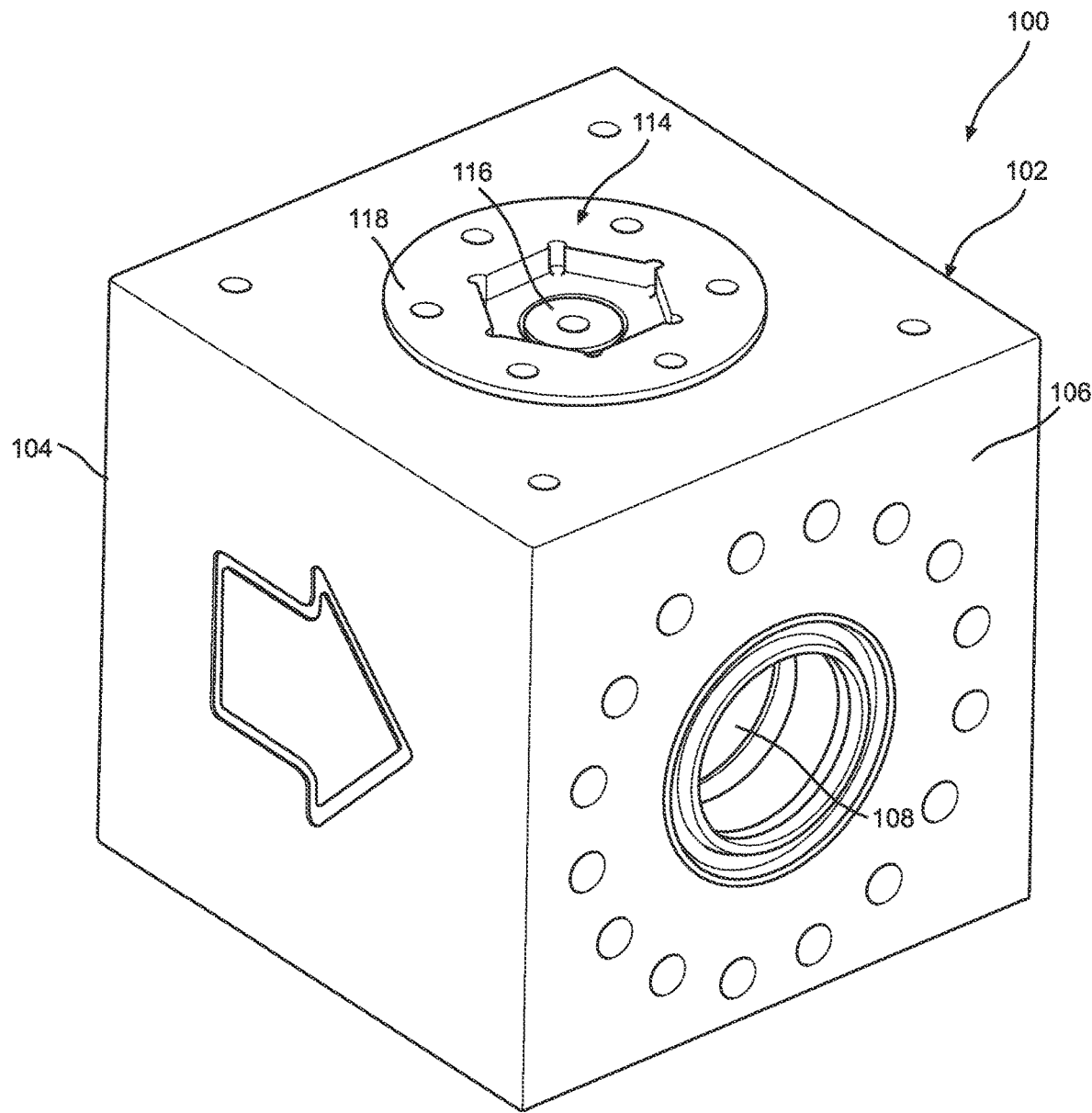
FIG. 3 is a perspective view of an illustrative embodiment of the check valve of the present disclosure.
Figure 4:
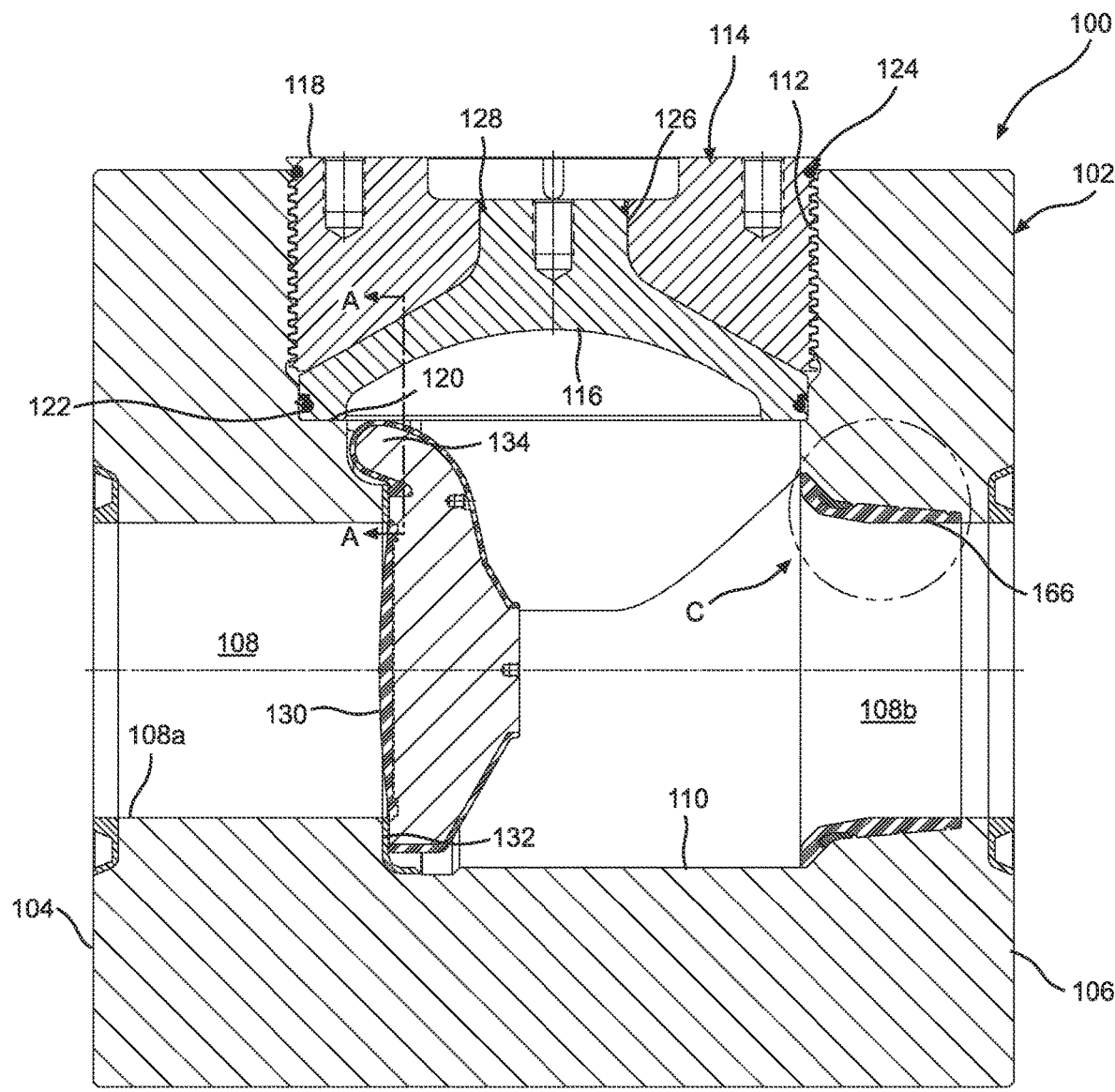
FIG. 4 is a cross sectional view of the check valve of FIG. 3.
Figure 5:
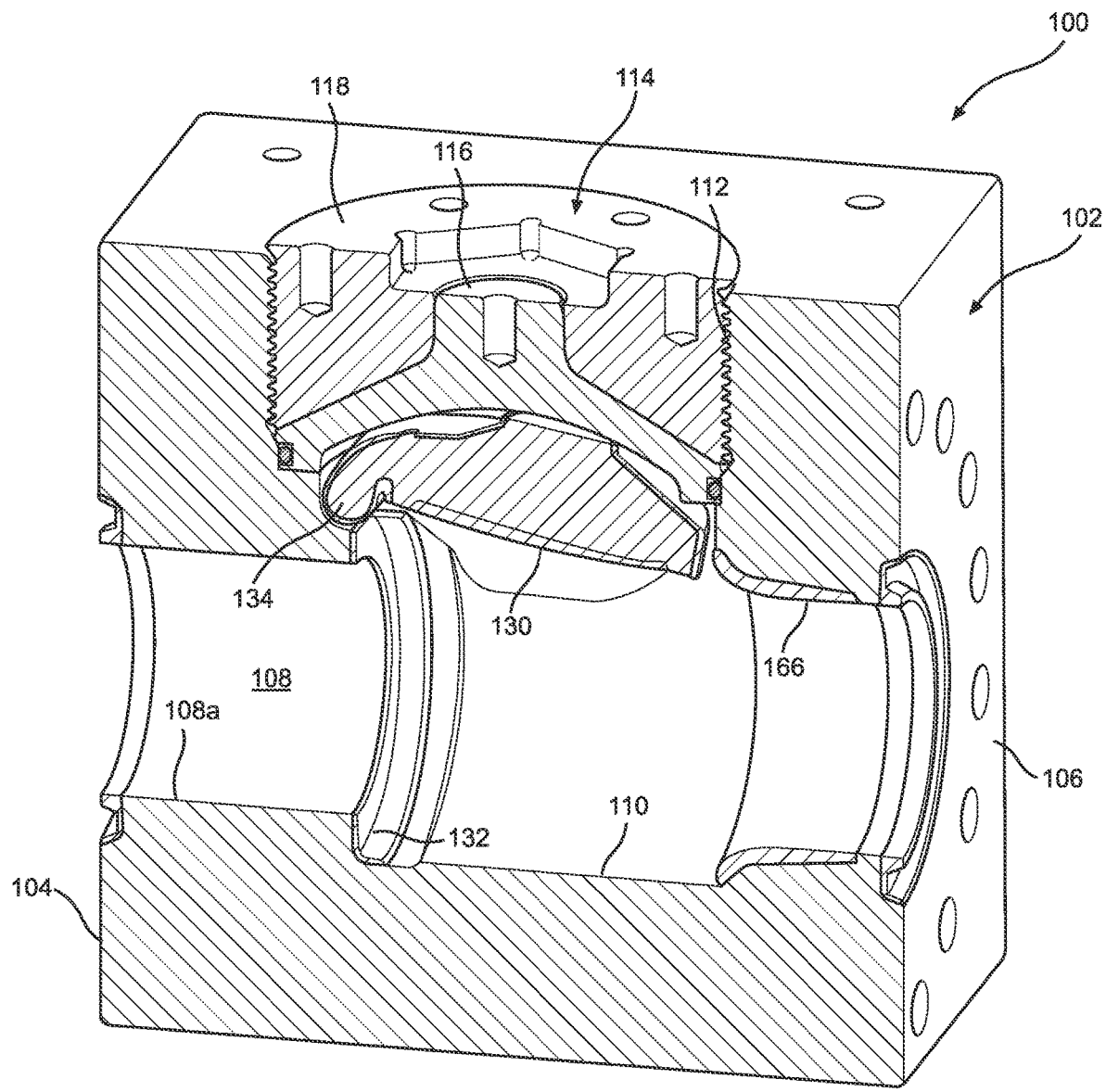
FIG. 5 is a perspective cross sectional view of the check valve of FIG. 3.

In accordance with the present disclosure, a check valve is provided which addresses many of the problems presented by prior art check valves. Referring to FIGS. 3-5, the check valve of the present disclosure, which is indicated generally by reference number 100, includes a valve body 102 having an upstream end 104, a downstream end 106, and a flow bore 108 which extends between the upstream and downstream ends. The upstream and downstream ends 104, 106 are configured to be connected to respective flow pipes or other flow components (not shown) by suitable connections (not shown). The valve body 102 may also include a cavity 110 which intersects the flow bore 108 between the upstream and downstream ends. In this embodiment, the cavity 110 comprises a cylindrical configuration having an axis which is oriented generally parallel to the axis of the flow bore 108.

In accordance with one embodiment of the disclosure, the cavity 110 may be accessible through a top opening 112 in the valve body 102 which is closed by a removable bonnet cap assembly 114. The bonnet cap assembly 114 may include, for example, a seal cap 116 and a separate retainer cap 118. As shown best in FIG. 4, the seal cap 116 is positioned against an annular shoulder 120 which is formed in the valve body 102 between the cavity 110 and the top opening 112. The retainer cap 118 is configured to be threaded or otherwise secured in the top opening against the seal cap 116 to thereby maintain the seal cap in position against the shoulder 120. The seal cap 116 may be sealed to the valve body 102 by a suitable seal 122 in order to retain pressure within the cavity 110, and the retainer cap 118 may be sealed to the top opening by any appropriate seal 124 in order to prevent environmental contaminants from migrating between the retainer cap and the valve body 102.

The embodiment of the bonnet cap assembly 114 just described allows the seal cap 116 and the retainer cap 118 to be installed and removed 100 individually. This provides a weight advantage over prior art one-piece bonnet caps, which due to their relatively large weights often require external lifting devices to install and remove, especially those designed for comparatively large valves. Of course, the bonnet cap assembly 114 may alternatively comprise a single-piece design.

If desired, the seal cap 116 may be configured with an axial extension 126 which protrudes through a corresponding hole in the retainer cap 118. Such an arrangement provides a visual indication that the seal cap 116 is actually present in the bonnet cap assembly 114 (see, e.g., FIG. 3). Although not required, the axial extension 126 may be sealed to the retainer cap 118 by a suitable seal 128.

The check valve 100 also includes a flapper 130 which is configured to seal against an annular valve seat 132 which is positioned across the flow bore 108. In one embodiment of the disclosure, the valve seat 132 may be formed integrally with the valve body 102 at the intersection of the cavity 110 and an upstream portion 108a of the flow bore 108. In addition, the valve seat 132 may be provided with a coating or cladding, such as a weld overlay. In an alternative embodiment, the valve seat 132 may comprise or be formed on a separate component which is positioned, e.g., in the cavity 110 or in a counterbore formed in the upstream portion 108a of the flow bore 108. Such an alternative valve seat 132 may be similar to the valve seat 38 described above.

Figure 6:
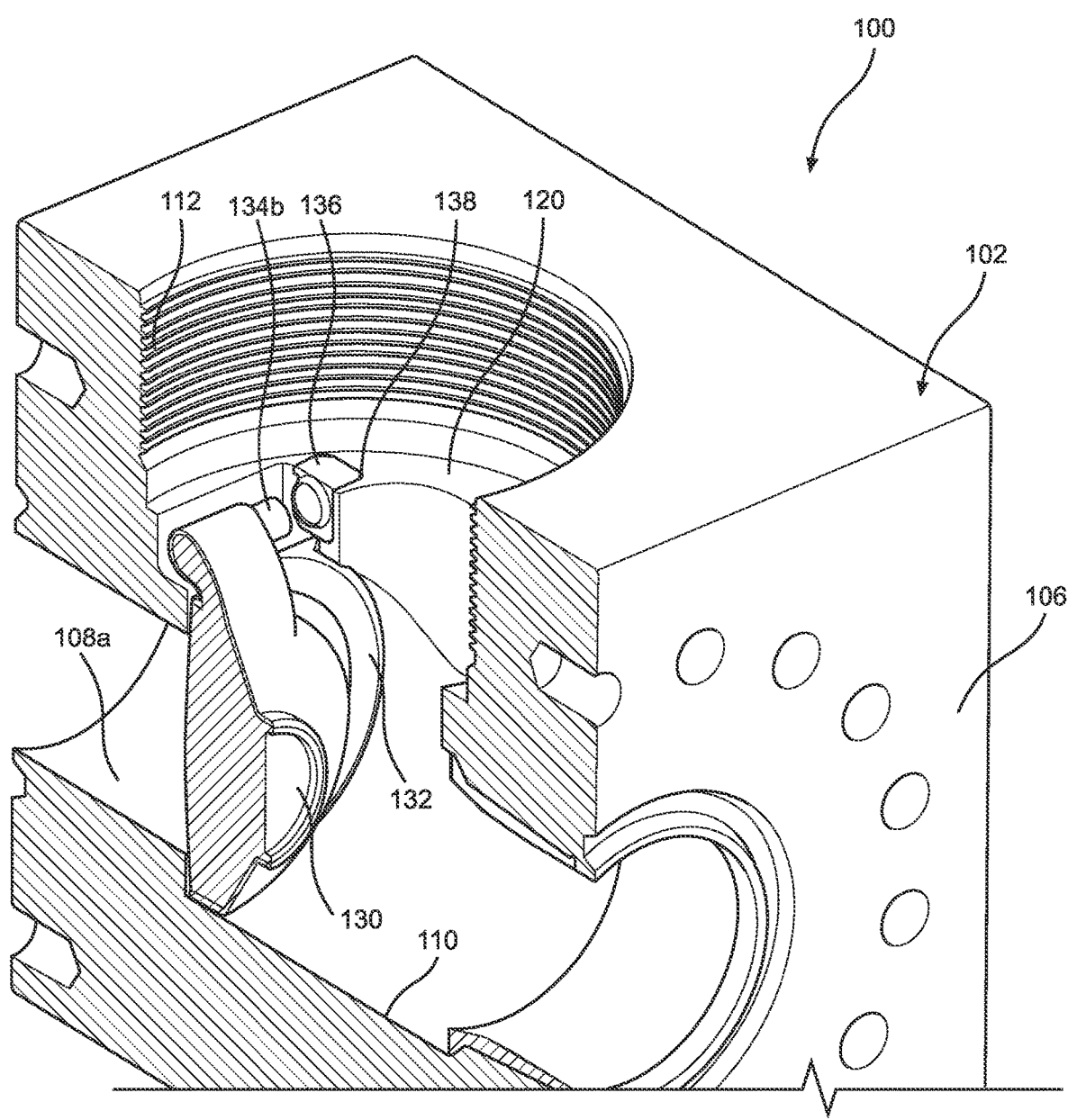
FIG. 6 is a perspective cross sectional view of a portion of the check valve of FIG. 3, with the body cap assembly removed for clarity and the flapper valve shown partially separated from the valve for illustrative purposes.

Referring also to FIG. 6, the flapper 130 is connected to a pivot pin 134 which is supported in the valve body 102 (although in FIG. 6 the pivot pin is shown separated from the valve body for purposes of illustration). In some embodiments, the flapper 130 may be fixedly connected to the pivot pin 134. In the embodiment shown in the drawings, the flapper 130 is formed integrally with the pivot pin 134. The flapper 130 may alternatively be pivotally connected to the pivot pin 134 in the manner of an articulating flapper.

As discussed above, a problem with prior art flappers is that misalignment between the mating sealing surfaces of the flapper and the valve seat may exist which prevents the flapper from sealing effectively when in the closed position. In accordance with the present disclosure, this problem is addressed by mounting the ends of the pivot pin 134 in resilient bushings which in turn are supported in the valve body. This arrangement will permit the flapper 130 to move into effective sealing engagement with the valve seat 132 even under low pressure differentials. In accordance with one embodiment, the resilient bushings are designed to allow upstream and downstream translation of the pivot pin 134 but still provide a spring force to bias the flapper 130 into its intended position. In this manner, the flapper 130 will seal against the valve seat 132 even with zero or minimal pressure differential across the flapper. This flexibility and biasing spring force will accommodate for manufacturing tolerances that tend to misalign the mating sealing faces of the flapper 130 and the valve seat 132.

In a specific example of the disclosure which is shown in FIGS. 6-9, the ends 134a, 134b of the pivot pin 134 (only one of which is shown in FIG. 6) are mounted in corresponding resilient bushings 136 which are supported in the valve body 102. (It should be noted that in FIG. 6, the end 134b of the pivot pin 134 is shown separated from the bushing 136 for purposes of illustration.) In one embodiment, the bushings 136 are made from an elastomeric material having sufficient flexibility to permit the flapper 130 to move into proper sealing position against the valve seat 132 even under relatively low pressure differentials.

The bushings 136 may be supported in the valve body 102 by any suitable means. In the embodiment shown in FIG. 6, for example, each bushing 136 is mounted in a corresponding pocket 138 which is fixed in position relative to the valve body. For example, the pockets 138 may be formed directly in the valve body 102 at any suitable location, such as between the cavity 110 and the top opening 112. In an alternative embodiment not shown in the drawings, the bushings 136 may be mounted in one or more separate components which in turn are supported in or positioned relative to the valve body 102. For example, the bushings 136 may be mounted in corresponding pockets which are formed in a retainer ring similar to the retainer ring 32 described above.

Figure 7:
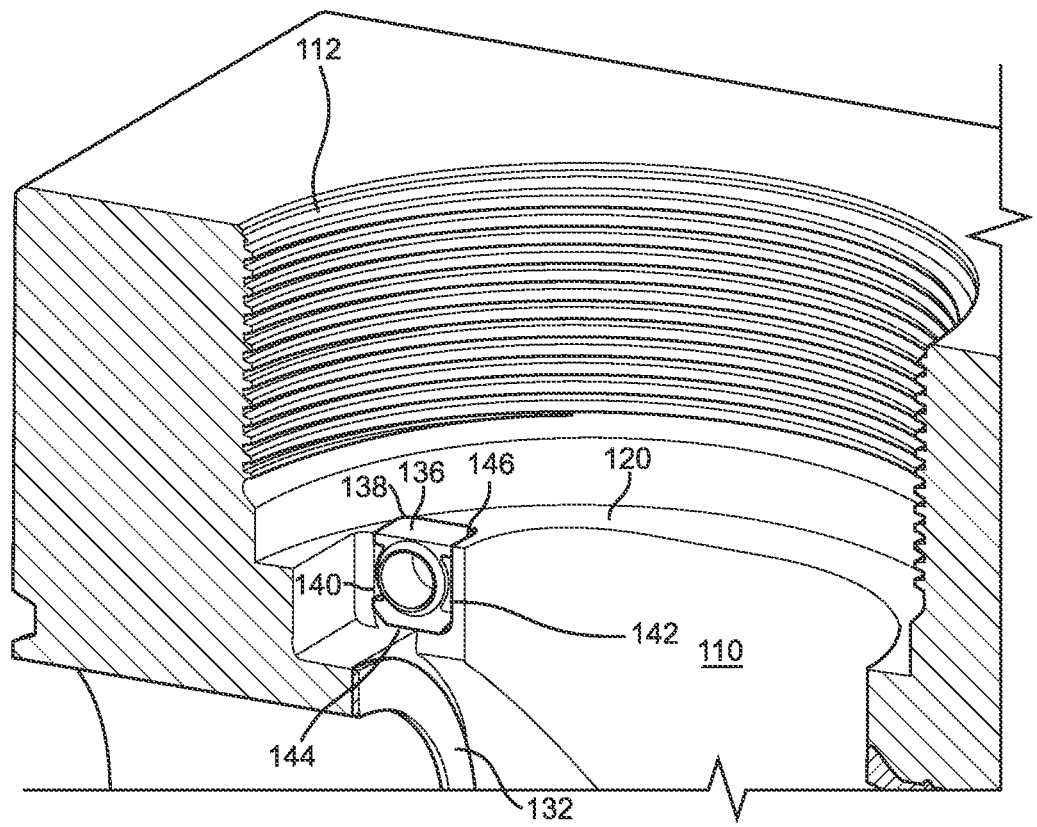
FIG. 7 is an enlarged view of a portion of FIG. 6 showing the resilient bushing component of one embodiment of the present disclosure mounted in the valve body.

Referring to FIG. 7, each pocket 138 may comprise a generally rectangular configuration having opposite first and second sides 140, 142, a closed bottom 144 and an open top 146. In this embodiment, the top 146 is formed in the annular shoulder 120 and the bushings 136 are retained in the pockets 138 through engagement with a bottom surface portion 148 of the bonnet cap assembly 114, which bottom surface portion may be formed, for example, on a bottom surface portion of the seal cap 116 (see FIG. 9). Alternatively, each pocket 138 may comprise any configuration which is shaped to receive its corresponding bushing 136.

The bushings 136 are designed to correct for any misalignment between the mating sealing surfaces of the flapper 130 and the valve seat 132 which may be caused, e.g., by manufacturing tolerance errors in the flapper 130, the pockets 138 and/or the valve seat 132. As the flapper 130 closes against the valve seat 132, any misalignment between the sealing surfaces will create misalignment forces which are transmitted to the ends 134a, 134b of the pivot pin 134. The bushings 136 are designed to elastically deform under these misalignment forces to thereby permit the sealing surfaces to come into alignment. The bushings 136 may be configured to respond to the misalignment forces differently depending on the direction of the misalignment. For example, the bushings 136 may be designed to permit the ends 134a, 134b of the pivot pin 134 to shift upstream or downstream until the sealing surface are aligned, but provide substantially rigid vertical and side-to-side support to prevent any offset between the centerlines of the sealing surfaces. In addition, the bushings 138 may be designed to provide a spring force on the ends 134a, 134b of the pivot pin 134 which will bias the flapper 130 back toward its seating position against the valve seat 132, thereby preventing the flapper from hanging ajar from the valve seat.

Figure 8:
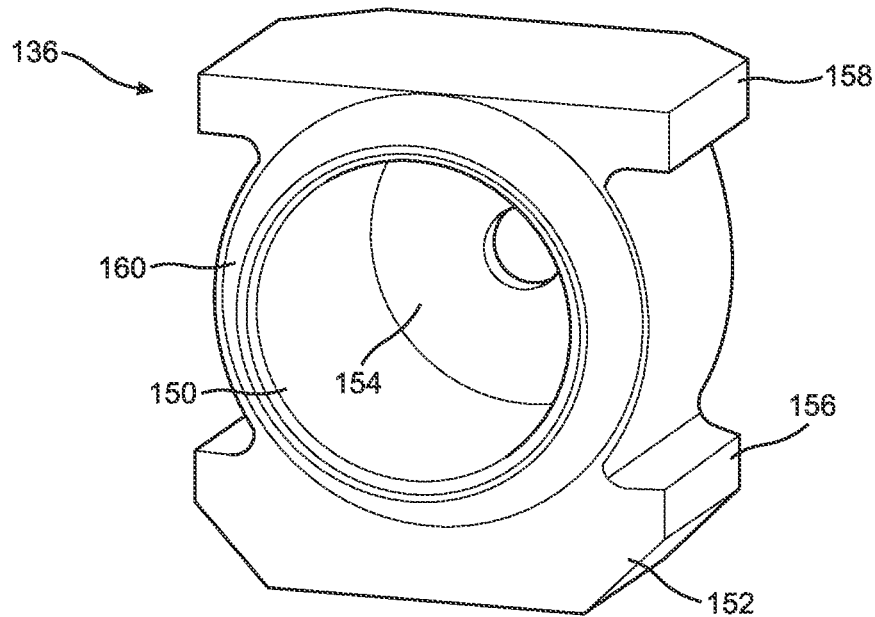
FIG. 8 is an enlarged view of the resilient bushing shown in FIG. 7.

Referring to FIG. 8, in accordance with one embodiment of the disclosure, each bushing 136 includes a socket 150 which is shaped to receive a corresponding end 134a, 134b of the pivot pin 134. The socket 150 is positioned over a base 152 which is supported on the bottom 144 of the pocket 138 (see FIG. 7). In this manner, the bushings 136 will provide substantially vertical support for the flapper 130. Also, the socket 150 comprises a back wall 154 which is configured to provide a tight fit between the adjacent wall of the pocket 138 and the end 134a, 134b of the pivot pin 134. As a result, the bushings 136 will provide rigid side-to-side support for the flapper 130.

In one embodiment, each bushing 136 may also comprise a number of flexible supports 156, 158 which extend laterally relative to the socket 150 and engage at least one of the opposite sides 140, 142 of the pocket 138. For example, each bushing 136 may comprise two flexible supports 156, 158 between which the socket 150 is positioned. The flexible supports 156, 158 are configured to provide a desired degree of flexibility to the bushings 136 to enable the sockets 150 to displace with the ends 134a, 134b of the pivot pin 134 in response to any misalignment forces created by misalignment between the sealing surfaces of the flapper 130 and the valve seat 132. The flexible supports 156, 158 may also be designed to provide a spring force to bias the pivot pin 134 in the upstream direction and thereby urge the flapper 130 into its intended position. In an alternative embodiment, the bushings 136 may be configured to fill or substantially fill their corresponding pockets 138.

Figure 9:
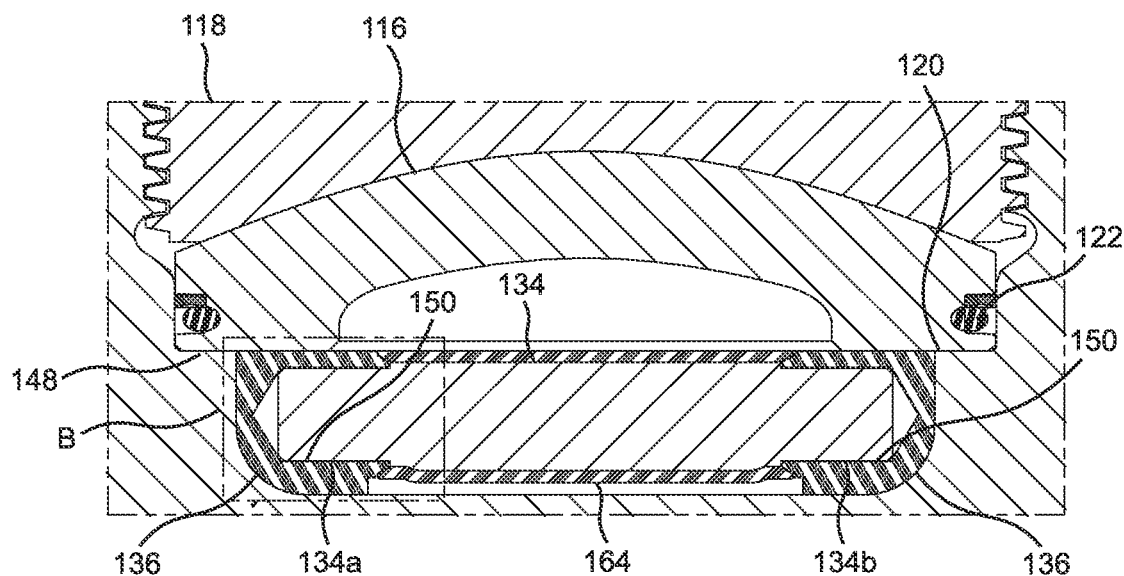
FIG. 9 is a cross sectional view of a portion of the check valve of FIG. 4 taken along the line A-A.
Figure 10:
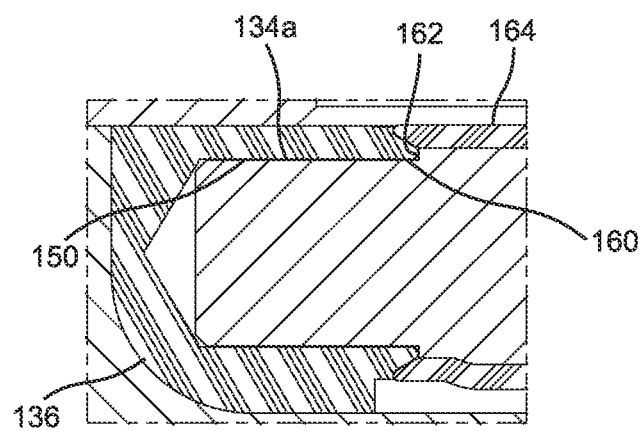
FIG. 10 is an enlarged view of the portion of FIG. 9 designated by the arrow B.

In accordance with another embodiment of the present disclosure, the pivot pin 134 and the bushings 136 may be configured to protect the ends 134a, 134b of the pivot pin from wear and abrasion. Referring to FIGS. 8-10, for example, each bushing 136 may comprise a circular rim 160 which is formed at the opening of the socket 150 and is configured to engage a corresponding annular shoulder 162 which is formed on the pivot pin 134 adjacent a respective end 134a, 134b. In this manner, the bushings 136 will prevent abrasive particles in the flow bore 108 from coming into contact with the ends 134a, 134b of the pivot pin 134. Excluding abrasive particles from the sliding surfaces of the pivot pin 134 in this manner will prevent wear and abrasion and thereby extend the life of the pivot pin and the bushings 136. In certain embodiments, the pivot pin 134 may also include a resilient coating 164 which as shown in FIG. 10 is configured to engage the rims 160 of the bushings 136 in order to provide an additional barrier protecting the ends 134a, 134b against abrasive particles.

As mentioned above, the flow bore 108 may be subject to erosion in certain situations, such as in well fracturing operations, where the check valve 100 is often used with chemicals and erosive particles at high velocities. The erosion is especially acute where the flow bore changes diameter, such as at the transition between the cavity 110 and the downstream portion of the flow bore 108. In accordance with a further embodiment of the disclosure, therefore, the check valve 100 may include means for reducing erosion in this area.

Figure 11:
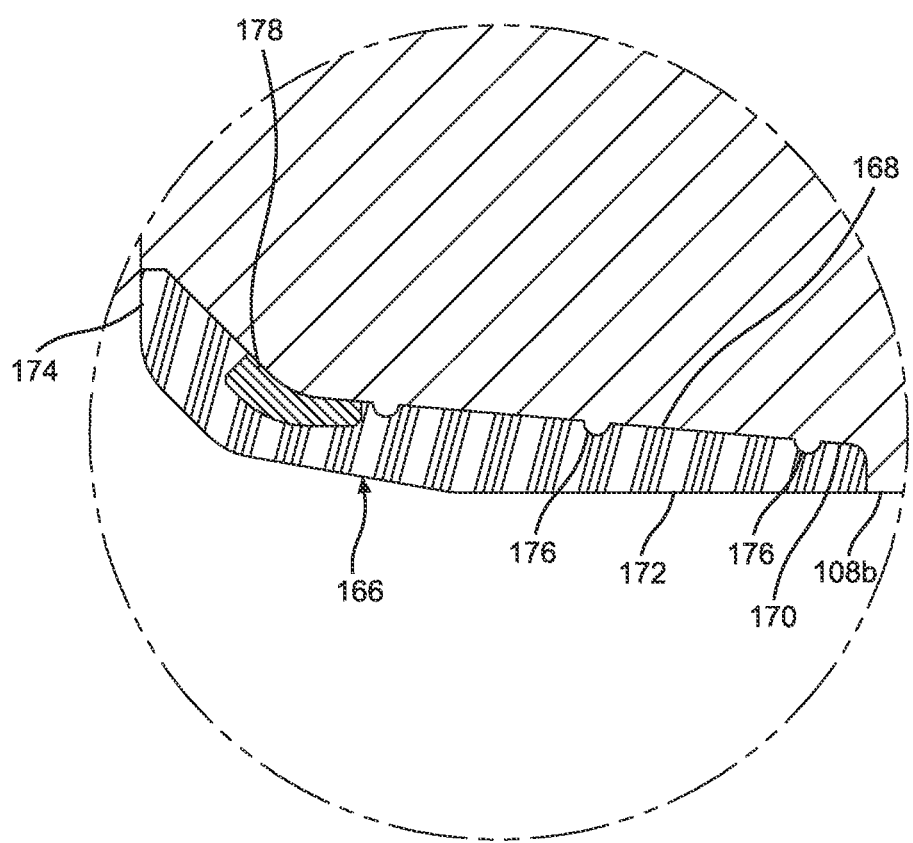
FIG. 11 is an enlarged view of the portion of FIG. 4 designated by the arrow C.

As shown best in FIGS. 4, 5 and 11, the erosion reducing means in accordance with one embodiment of the disclosure comprises an annular urethane or elastomer insert 166 which is positioned in the downstream portion 108b of the flow bore 108 adjacent the cavity 110. The insert 166 comprises an outer diameter surface 168 which is configured to conform to the profile of the downstream portion 108b. In certain embodiments, the insert 166 may be positioned in an enlarged diameter recess 170 in the downstream portion 108b. In this case, the insert 166 ideally comprises a downstream section 172 having an inner diameter about the same as the diameter of the downstream portion 108b.

In some embodiments, the insert 166 includes an upstream end face or transition 174 which is oriented at an angle (e.g., approximately ninety degrees) relative to a centerline of the flow bore. This feature is particularly beneficial in preventing the fluid particle flow from impacting the intersection of the cavity 110 and the downstream portion 108b, especially when the downstream portion is designed to converge from the cavity toward the downstream end 106 of the check valve. In this manner, the insert 166 will absorb the energy from the particle impacts and thereby protect the portion of the valve body 102 which surrounds the insert.

As best shown in FIG. 11, the check valve 100 may include means for retaining the insert 166 in position in the downstream portion 108b of the flow bore 108. For example, the check valve 100 may include a number of circular retention ridges 176 which are formed in the downstream portion 108b (or the recess 170, if present) coaxially therewith. These retention ridges 176 are configured to engage the outer diameter surface 168 of the insert 166 to thereby help retain the insert in position. In other embodiments, the means for retaining the insert 166 in position may comprise threads, divots or any other surface feature which is formed in the downstream portion 108b (or the recess 170, if present) and serves to retain the insert in position. In certain embodiments, the check valve 100 may also comprise a stiffening ring 178 which encircles the insert 166 and is bonded to or embedded in the outer diameter surface 168. The stiffening ring 178 is designed to impart circumferential strength to the insert 166 to better ensure that the insert will remain in position in the downstream portion 108b or the recess 170.

Figure 12:
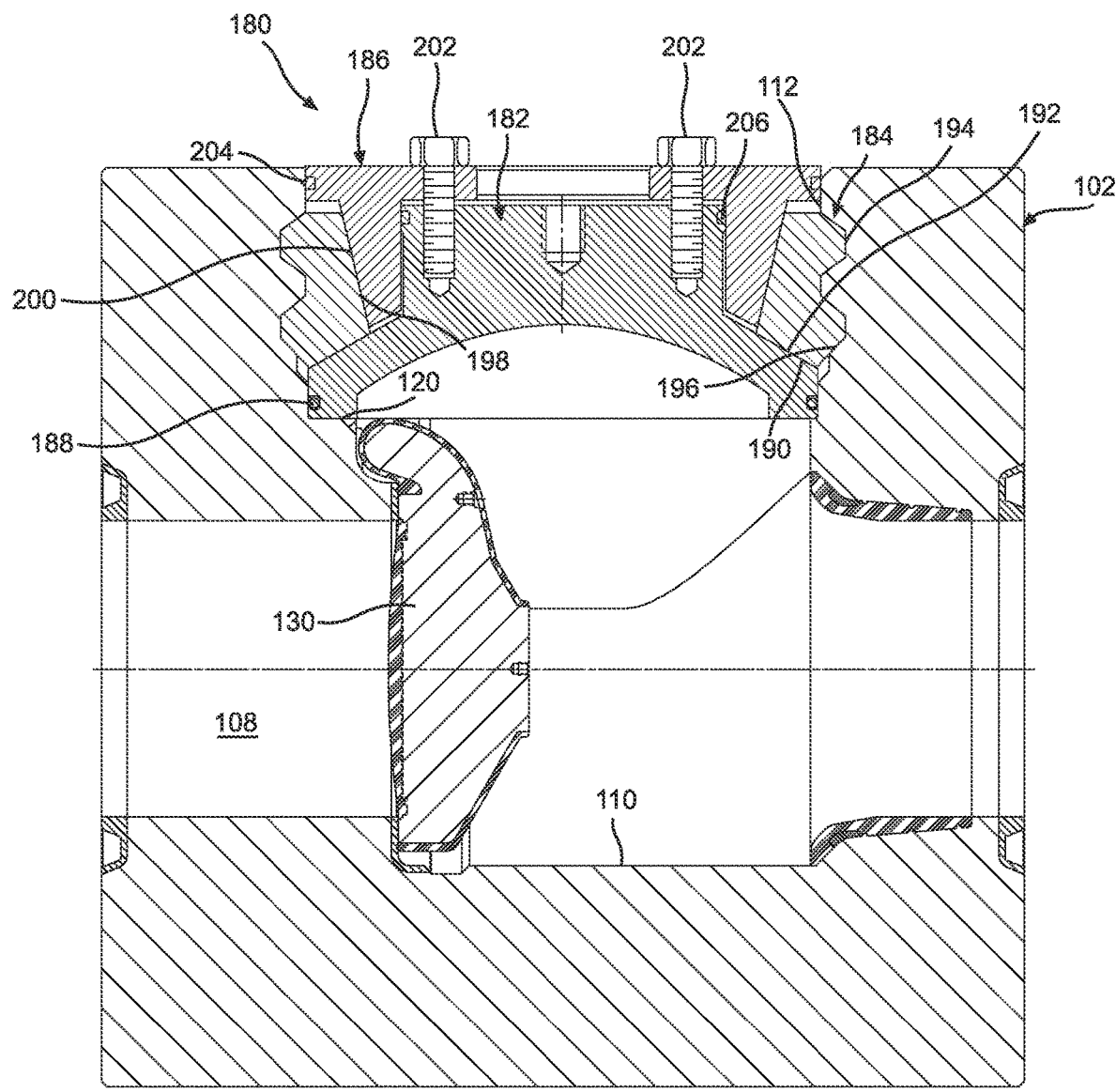
FIG. 12 is a cross sectional view of another embodiment of the check valve of the present disclosure.

An alternative embodiment of a bonnet cap assembly will now be described with reference to FIG. 12. Similar to the bonnet cap assembly 114 described above, the bonnet cap assembly of the present embodiment comprises a number of separate pieces which are relatively lightweight and easy to handle. Accordingly, the bonnet cap assembly can be installed and removed relatively quickly and easily without the need for external lifting equipment. Although the bonnet cap assembly of this embodiment is suitable for use with a variety of check valve designs, for purposes of simplicity it will be described in the context of the swing check valve 100 discussed above.

The bonnet cap assembly of the present embodiment, which is indicated generally by reference number 180, includes a seal cap 182 which is retained in position in the top opening 112 by a segmented ring 184 that in turn is retained in position by a locking ring 186. As shown in FIG. 12, the seal cap 182 may be positioned on the shoulder 120 between the cavity 110 and the top opening 112. Alternatively, the seal cap 182 may be supported in the top opening 112 on some other feature of the valve body 102 or on a separate component which is supported by the valve body. The seal cap 182 is sealed to the valve body 102 by a suitable seal 188 to thereby provide the primary pressure barrier between the flow bore 108 and the environment. In an alternative embodiment, the seal 188 may be sealed to a separate component which in turn is sealed to the valve body 102.

The segmented ring 184 functions to retain the seal cap 182 in position in the top opening 112. In the present embodiment, for example, the segmented ring 184 functions to retain the seal cap 182 in position against the shoulder 120 in order to ensure that the seal 188 remains sealingly engaged with the valve body 102 (or with a separate component which in turn is sealed to the valve body). In accordance with one embodiment of the present disclosure, the segmented ring 184 is comprised of a number (e.g., four) of separate ring segments which can be positioned and removed individually. In an alternative embodiment, the segmented ring 184 may comprise a single component. In the embodiment shown in FIG. 12, the segmented ring 184 comprises a downwardly directed portion 190 which is configured to engage an upwardly directed portion 192 of the seal cap 182, a radially outer portion 194 which is configured to engage a matching locking profile 196 formed in the top opening 112, and a radially inner portion 198 which, when the segmented ring is oriented as shown in FIG. 12, may be designed to converge radially inwardly from top to bottom.

The locking ring 186 functions to force the segmented ring 184 radially outwardly into the locking profile 196 and to retain the segmented ring in this position in order to ensure that the seal cap 182 remains firmly secured in the top opening 112. The locking ring of this embodiment includes a radially outer portion 200 which is configured to engage the radially inner portion 198 of the segmented ring 184. For example, when the radially inner portion 198 of the segmented ring 184 is designed to converge radially inwardly from top to bottom, the radially outer portion 200 of the locking ring 186 may also designed to converge radially inwardly from top to bottom to ensure a close sliding fit between these components. As the locking ring 186 is moved into the locked position shown in FIG. 12, the radially outer portion 200 of the locking ring 186 will slide against the radially inner portion 198 of the segmented ring 184 and force the segmented ring into the locking profile 196.

In the present embodiment, the locking ring 186 is moved into and secured in the locked position by a number of cap screws 202, each of which extends through a corresponding hole in the locking ring and into a threaded hole in the seal cap 182. As the cap screws 202 are threaded into the seal cap 182 and tightened against the locking ring 186, any resulting upwardly directed force on the seal cap will be transmitted through the segmented ring 184 and into the valve body 102 to thereby prevent the seal cap from lifting off of the shoulder 120.

The bonnet cap assembly 180 may be installed in the top opening 112 as follows. First, the seal cap 182 is inserted in the top opening 112 and positioned against the shoulder 120. Next, the individual segments of the segmented ring 184 (or the entire segmented ring, if it comprises a single component) are lowered through the top opening 112 until their lower surface portion 190 rests on the seal cap 182. Then, the locking ring 186 is inserted between the seal cap 182 and the segmented ring 184, after which the cap screws 200 are threaded into the seal cap and tightened to move the locking ring downward toward the seal cap. This action will force the segmented ring 184 radially outwardly into the locking profile 196 to thereby lock the seal cap 182 in position against the shoulder 120. The bonnet cap assembly 180 can be removed by reversing the above steps. If desired, the locking ring 186 may be sealed to the valve body 102 and the seal cap 182 by suitable seals 204 and 206, respectively.

Thus, it may be seen that the bonnet cap assembly 180 provides a distinct advantage over prior art bonnet caps. Instead of a single, heavy structure, the seal cap 182, the locking ring 186 and the individual segments of the segmented ring 184 (or the entire segmented ring, if it comprises a single component) are relatively lightweight pieces which can be handled, assembled and disassembled separately. As a result, the bonnet cap assembly 180 can be easily installed and removed without the need for separate lifting equipment.

It should be recognized that, while the present disclosure has been presented with reference to certain embodiments, those skilled in the art may develop a wide variation of structural and operational details without departing from the principles of the disclosure. For example, the various elements shown in the different embodiments may be combined in a manner not illustrated above. Therefore, the following claims are to be construed to cover all equivalents falling within the true scope and spirit of the disclosure.

What is claimed is:
1. A check valve comprising:
a valve body which includes an inlet end, an outlet end and a flow bore that extends between the inlet and outlet ends;
a valve seat which is positioned across the flow bore; and
a flapper which is configured to seal against the valve seat, the flapper being connected to or formed integrally with a pivot pin and being pivotable between a closed position in which the flapper is positioned against the valve seat and an open position in which the flapper is displaced from the valve seat;

wherein the pivot pin comprises opposite first and second ends, each of which is supported in a corresponding resilient bushing which is fixed in position relative to the valve body;

wherein the resilient bushings are configured to generate a spring force on the pivot pin; and wherein each bushing is configured to bias the pivot pin toward the inlet end of the valve body.

2. The check valve of claim 1, wherein each bushing is positioned in a corresponding pocket which is fixed in position relative to the valve body.

3. The check valve of claim 2, wherein each pocket is formed directly in the valve body.

4. The check valve of claim 3, wherein each pocket comprises a bottom and opposite first and second sides which are oriented generally parallel to a longitudinal axis of the pivot pin.

5. The check valve of claim 4, wherein each bushing comprises a socket within which the corresponding first or second end of the pivot pin is positioned.

6. The check valve of claim 5, wherein each bushing comprises a base which extends downwardly from the socket and comprises a generally flat bottom surface which is supported on the bottom of the pocket.

7. The check valve of claim 5, wherein each bushing comprises a number of flexible supports which extend laterally relative to the socket and engage at least one of the first and second sides of the pocket.

8. The check valve of claim 7, wherein the flexible supports are configured to bias the pivot pin towards the inlet end of the valve body.

9. The check valve of claim 5, wherein each bushing comprises a circular rim which is formed at an opening of the socket and is configured to engage a corresponding annular shoulder which is formed on the pivot pin adjacent a respective first or second end to thereby inhibit abrasive particles in the flow bore from contacting the first and second ends.

10. The check valve of claim 1, wherein the valve body includes a cavity within which the flapper is positioned, a top opening which is connected to the cavity, and a bonnet cap assembly which is removably secured in the top opening; wherein the top opening is configured to permit passage of the flapper into and out of the cavity.

11. The check valve of claim 10, wherein the bonnet cap assembly comprises:

a seal cap which is positioned in the top opening over the cavity and is sealed to the valve body to thereby retain pressure in the cavity; and a retainer cap which is secured in the top opening over the seal cap to thereby maintain the seal cap in position;

wherein the seal cap and the retainer cap can be installed in and removed from the top opening individually.

12. The check valve of claim 11, wherein the seal cap comprises an axial extension which extends completely through a corresponding hole in the retainer cap.

13. The check valve of claim 10 or 11, wherein each bushing is positioned in a corresponding pocket which is fixed in position relative to the valve body and each bushing is retained in fixed position in the pocket by engagement of the bushing with the bonnet cap assembly.

14. The check valve of claim 13, wherein each pocket comprises a bottom, opposite first and second sides which are oriented generally parallel to a longitudinal axis of the pivot pin, and an open top which is located in an annular shoulder formed in the valve body between the cavity and the top opening, and wherein the bonnet cap assembly comprises a bottom surface portion which engages the annular shoulder to thereby retain the bushings in their corresponding pockets.

15. The check valve of claim 14, wherein each bushing comprises a socket within which the corresponding first or second end of the pivot pin is positioned.

16. The check valve of claim 15, wherein each bushing comprises a base which is positioned beneath the socket and comprises a generally flat bottom surface which is supported on the bottom of the pocket.

17. The check valve of claim 15, wherein each bushing comprises a number of flexible supports which extend laterally relative to the socket and engage at least one of the first and second sides of the pocket.

18. The check valve of claim 17 wherein the flexible supports are configured to bias the pivot pin towards the inlet end of the valve body.

19. The check valve of claim 10, wherein the bonnet cap assembly comprises:

a seal cap which is positioned in the top opening and sealed to the valve body to thereby retain pressure in the cavity;

a segmented ring which engages the seal cap to thereby maintain the seal cap in position in the top opening; and a locking ring which engages the segmented ring to thereby maintain the segmented ring in position against the seal cap;

wherein the seal cap, the segmented ring and the locking ring can be installed in and removed from the top opening individually.

20. The check valve of claim 19, wherein the segmented ring is comprised of a plurality of individual segments.

21. The check valve of claim 19 or 20, wherein the segmented ring comprises a downwardly directed portion which is configured to engage an upwardly directed portion of the seal cap, a radially outer portion which is configured to engage a matching locking profile in the valve body, and a radially inner portion.

22. The check valve of claim 21, wherein the locking ring comprises a radially outer portion which is configured to engage the radially inner portion of the segmented ring such that, when the locking ring is inserted between the seal cap and the segmented ring and moved into a locked position, the radially outer portion of the locking ring engages the radially inner portion of the segmented ring and forces the segmented ring radially outwardly into the locking profile.

23. The check valve of claim 22, wherein the bonnet cap assembly further comprises means for moving the locking ring into the locked position.

24. The check valve of claim 23, wherein the means for moving the locking ring into the locked position comprises a number of screws which are inserted through corresponding holes in the locking ring and into corresponding threaded holes in the seal cap.

25. The check valve of claim 1, wherein the valve body includes a cavity within which the flapper is positioned, the flow bore comprises a downstream portion which extends between the cavity and the outlet end, and the check valve further comprises a urethane insert which is positioned in the downstream portion adjacent the cavity.

26. The check valve of claim 25, wherein the insert is positioned in an enlarged diameter recess in the downstream portion.

27. The check valve of claim 25 or 26, wherein the insert comprises an upstream end face which is oriented at an angle relative to a centerline of the flow bore.

28. The check valve of claim 25 or 26, further comprising means for retaining the insert in the downstream portion of the flow bore.

29. The check valve of claim 28, wherein the means for retaining the insert in the downstream portion of the flow bore comprises a number of circular retention ridges which are formed in the downstream portion or the recess coaxially therewith and engage an outer diameter surface of the insert.

30. The check valve of claim 25 or 26, further comprising a stiffening ring which is bonded to or embedded in an outer diameter surface of the insert coaxially with therewith.

* * * * *